United States Patent [19]

Beekman et al.

[11] Patent Number: 5,536,767
[45] Date of Patent: Jul. 16, 1996

[54] POLYOL ESTERS OF ZINC MERCAPTOACIDS AS HEAT STABILIZERS FOR PVC PROCESSING

[75] Inventors: George F. Beekman, Middletown; Keith A. Mesch; Lionel R. Price, both of Cincinnati, all of Ohio

[73] Assignee: Morton International, Inc., Chicago, Ill.

[21] Appl. No.: 402,300

[22] Filed: Mar. 10, 1995

Related U.S. Application Data

[63] Continuation of Ser. No. 295,958, Aug. 25, 1994, abandoned, which is a continuation of Ser. No. 174,644, Dec. 28, 1993, abandoned, which is a continuation of Ser. No. 57,722, May 5, 1993, abandoned.

[51] Int. Cl.$^6$ ................................................. C08K 5/36
[52] U.S. Cl. ........................................... 524/301; 556/130
[58] Field of Search ............................ 524/301; 556/130, 556/131, 77

[56] References Cited

U.S. PATENT DOCUMENTS

| | | | |
|---|---|---|---|
| 2,680,726 | 6/1954 | Weinberg et al. | 524/301 |
| 4,287,118 | 9/1981 | Muldrow | 524/301 |
| 4,396,552 | 8/1983 | Knobloch et al. | 524/301 |
| 4,515,916 | 5/1985 | Molt | 524/301 |
| 4,755,549 | 7/1988 | Kemper et al. | 524/301 |

FOREIGN PATENT DOCUMENTS 147364  4/1981  Germany.

*Primary Examiner*—Veronica P. Hoke
*Attorney, Agent, or Firm*—Robert M. Didrick; Gerald K. White

[57] ABSTRACT

A zinc mercaptoacid ester of a polyhydric alcohol or ether, carboxylate, or ether-carboxylate thereof having at least one functional hydroxy group are improved heat stabilizers for halogen-containing polymer compositions. The phenomenon known as zinc burn during processing of such compositions is eliminated. Zinc bis-thioglycolates, zinc mercaptopropionates and zinc bis-mercaptosuccinates of glycols, glycerol, glycol ethers, glycol carboxylates, and glycerol carboyxlates exemplify the new class of heat stabilizers.

18 Claims, No Drawings

POLYOL ESTERS OF ZINC MERCAPTOACIDS AS HEAT STABILIZERS FOR PVC PROCESSING

This is a continuation of application Ser. No. 08/295,958 filed on Aug. 25, 1994, now abandoned.

BACKGROUND OF THE INVENTION

Halogen containing polymers, especially those containing chlorine, are used widely and have great commercial significance. Polyvinyl chloride (PVC), in particular, is used in packaging, siding, pipe, and many extruded shapes. Such large scale and diverse use of the halogen-containing polymers depends upon the incorporation therein of good head and light stabilizers. PVC, for example, is known to have a tendency to degrade upon prolonged exposure to heat and light during processing and use. Darkening or other color change and the loss of tensile, flexural, and impact strengths are the results of such degradation. Unless good low-cost stabilizers are available for addition to the polymer composition, the service life of articles made from the composition is limited, and its use severely restricted, as will be the conditions for making it.

One particularly troublesome form of degradation occurs when the polymer composition is processed into articles by methods employing heat to melt or soften the polymer. A color change can occur during the first few minutes at high temperatures (e.g., from about 175° to about 200° C.) and it is commonly referred to as early color or early discoloration. The avoidance of such early color is notably important in the manufacture of plastic pipe and siding. It is, of course, also important to prevent or reduce discoloration and deterioration of the polymer during extended exposure to high temperatures, which can lead to sudden and catastrophic degradation into a pitch-like abrasive material and cause the formation of corrosive materials such as HCl inside the fabricating equipment. The inner, highly polished surfaces of the equipment can thus be rendered essentially useless. A particularly troublesome instance of such sudden degradation often occurs when zinc compounds are employed as stabilizers; the phenomenon is known as "zinc burn" in the PVC industry.

An example of zinc burn is illustrated in U.S. Pat. No. 4,515,916, wherein a PVC composition containing zinc bis-(octyl thioglycolate) as a stabilizer showed such burn after 3 minutes on a two roll mill at 193° C.

SUMMARY OF THE INVENTION

It is an object of this invention to provide an improved heat stabilizer for halogen-containing polymer compositions.

It is an object of this invention to provide a halogen-containing polymer composition having improved heat stability.

It is a related object of this invention to eliminate zinc burn during the processing of PVC compositions at elevated temperatures.

These and other objects which will become apparent from the following description are achieved by incorporating in a composition comprising a halogen-containing polymer a novel zinc mercaptoester having the formula:

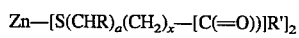

$$Zn-[S(CHR)_a(CH_2)_x-[C(=O)]R']_2$$

wherein

R is methyl or C(=O)OR';

R' is $[(CH_2-[C-(R^1)(R^2)]_yCH_2O)_xR^3]$;

$R^1$ is H, alkyl, or hydroxy alkyl;

$R^2$ is OH, hydroxy-substituted alkyl, or O(O=)C—$R^3$;

$R^3$ is alkyl, alkenyl, or aryl;

$R^4$ is H, (O=)C—$R^3$ alkyl, or aryl; and a=0 or 1; x=1 or 2; y=0 or 1; and z=1 to 4;

with the proviso that when z is greater than 1, y=0.

The alkyl and hydroxyalkyl groups have from 1 to 10 carbon atoms, preferably 4 or fewer. Aryl groups are exemplified by phenyl.

Examples of this new class of zinc bis-mercaptoacid ester include zinc bis-thioglycolate, zinc bis-mercaptorpropionate, and zinc mercaptosuccinate of a polyhydric alcohol or ether, carboxylate, or ether-carboxylate thereof having at least one functional hydroxy group as exemplified by ethylene glycol, glycerol, tetraethylene glycol, trimethylolethane, pentaerythritol, glycol ethers such as tetraethylene glycol monobutyl ether, and diethylene glycol monoethyl ether, glycol mono-carboxylates such as diethylene glycol monocaprate and ethylene glycol monocaprate, and glycerol carboxylates such as glycerol monocaprate, all of which are either available commercially or are made easily by conventional methods. The mercaptoacid esters may be made by conventional procedures wherein the mercaptoacid and the hydroxyl-group bearing compound are heated in the presence of a suitable catalyst such as methanesulfonic acid or p-toluene sulfonic acid and an azeotropic organic solvent such as toluene or heptane. Alternatively, the esterification may be conducted at reduced pressure. The reaction is continued until the acid number is reduced to about 12–15.

The acids from which the esters are derived are also generally available commercially but may be made if so desired by procedures of long-standing in the chemical arts. Mercaptoacetic acid, for example, may be made by the reaction of sodium hydro-sulfide with sodium chloroacetate and subsequent acidification. β-mercaptopropionic acid is obtained in about 80% yield from the reaction of sodium hydrosulfide with β-propiolactone in acetonitrile and subsequent acidification. Mercaptosuccinic acid may be made by adding hydrogen sulfide across the double bond of maleic anhydride followed by hydrolysis. Also suitable for the purposes of this invention are the alkyl esters of α-mercaptopropionic acid, which may be prepared from α-chloropropionic acid and sodium thiosulfate according to the procedure described in U.S. Pat. No. 2,413,361, which is incorporated herein by reference.

The zinc mercaptoesters are easily prepared by the reaction of the corresponding mercaptoacid ester with zinc chloride in the presence of a suitable hydrogen chloride scavenger such as ammonia, ammonium hydroxide, and an alkali metal hydroxide or a carbonate thereof. Another method is the condensation of the mercaptoacid ester with zinc oxide in an organic medium such as a high boiling naphtha, xylene, paraffin wax and the like. Any ratio of the zinc compound and the mercaptoester will suffice so long as the reaction conditions are such as to drive the condensation but it is preferred to use a stoichiometric ratio of the reactants. Atmospheric pressure is suitable but the reaction will proceed satisfactorily at from about 50° to about 80° C. under reduced pressure. The maximum temperature is about 140°–150° C.

The stabilizer compositions of this invention may also contain a substituted dihydropyridine as taught in U.S. Pat. No. 4,515,916. As used herein, the term substituted dihydropyridine means a heterocyclic compound represented by the formula:

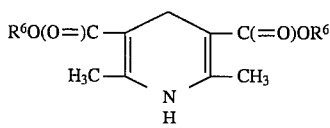

wherein $R^6$ is the same or different saturated alkyl radical having from 1 to 20 carbon atoms in a straight or branched chain. Examples of particular dihydropyridines which are suitable include those in which both $R^6$ radicals are ethyl or dodecyl. A method for the preparation of said dihydropyridines is taught in U.S. Pat. No. 4,209,439, which is incorporated herein by reference.

The halogen containing polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. As vinyl halide homopolymers, vinyl halide copolymers and polymer blends containing vinyl halide homopolymers or vinyl halide copolymers usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate methyl acrylate, 2-ethylhexyl acrylate, butyl acryalate, ethyl acrylate, and other alkyl acrylates, methyl methacrylate, ethyl methacrylate, butyl methacrylate, hydroxyethyl methacrylate and other alky methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro-1-chloroethelene, acrylonitrile, chloroacrylontirile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylemethacrylate, polyvinyl chloride and polystyrene, polyvinyl chloride and acrylontirile-butadiene-styrene copolymer, and polyvinyl chloride and polyetheylene and polymethy methacrylate. Typical vinyl halide copolymers usable in this invention include vinyl chloride-vinyl acetate (87:13), vinyl chloride-vinylidene chloride (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer.

For the purposes of this invention, the stabilizer composition may include lubricants because of their important effect on the stability of the polymer compositions during mastication and extrusion. The amount of each component in the stabilizer compositions of this invention may vary over a wide range but they will generally comprise, by weight, from about 5% to about 85%, preferably about 10% to about 20%, of the zinc mercaptoester of this invention, about 5% to about 20%, preferably about 10% to about 15%, of an inorganic basic alkali or alkaline earth compound such as calcium carbonate, from about 20% to about 80% of a lubricant such as paraffin wax, ethylene bis-stearamide, and calcium stearate; and, when employed, from about 5% to about 10% of the substituted dihydropyridine. From 0 to about 10% of a partially oxidized polyethylene such as Allied Chemical's product sold under the trademark AC629A may be used as an additional lubricant in the compositions of this invention.

In addition to the halogen-containing polymer and the stabilizer composition, the polymer composition of this invention may contain conventional additives such as fillers, pigments, plasticizers, dyes, antioxidants, and ultraviolet light stabilizers. It may also contain lubricants other than those described above, such others being exemplified by stearyl stearate, cetyl palmitate, and other ester waxes. Materials such as calcined clays, calcium carbonate, and talcs may be used as fillers. Suitable pigments include titanium dioxide, carbon black, and iron oxide. Phthalates, sebacates, adipates, phosphates, and fatty esters having between 16 and 150 carbon atoms are representative of well known plasticizers suitable for the compositions of this invention. Suitable antioxidants include tricrsyl phosphite; 2,6-di-t-butyl-4-methyl phenol; 2,6-di-t-butyl-4-decyloxy phenol; and 2-t-butyl-4-octadecyloxy phenol.

The amount of the stabilizer composition employed in the polymer compositions of this invention may vary over a wide range. An effective amount is, of course, all that is needed. In general, that effective amount may be as little as 0.10 part by weight, or less, of the stabilizer composition per hundred parts by weight of the halogen-containing polymer. While there is no critical upper limit on the amount of stabilizer composition, amounts in excess of 15 parts by weight per hundred parts by weight of the halogen-containing polymer do not yield a commensurate increase in effectiveness. Preferably, the stabilizer compositions of this invention are employed in amounts ranging from about 0.4 part to about 7 parts by weight per hundred parts by weight of the halogen-containing polymer.

The polymer composition of this invention may be prepared by methods well known in the art and by the use of conventional equipment. The stabilizer composition may be added to the halogen-containing polymer with continuous blending in a high intensity mixer such as a Henschel blender. The important consideration is that the stabilizer composition and the halogen-containing polymer be thoroughly blended.

The stabilized halogen-containing polymer compositions of this invention may be used to form articles of manufacture such as pipe. A variety of conventional molding techniques may be employed to form the stabilized compositions into any desired shape.

The following examples illustrate the invention.

EXAMPLE 1

Thioglycolic acid (92.12 grams, 1 mole), glycerol, (92.09 grams, 1 mole), 100 mls of heptane, 0.4 grams of p-toluenesulfonic acid, and 0.1 gram of butyl hydroxyltoluene were added to a 500 ml round bottom flask equipped with a condenser and a Dean-Stark trap and the materials were heated to 100° C. Azeotropic distillation of water was carried out at 90° C. until 18.2 mls were collected. The heptane was stripped off and a portion of the residue was stripped further to 110° C. at a pressure of 10–20 Torr to reach an acid value of 15 and an SH value of 17.29. The theoretical SH value is 19.85. Filtration of the residue provided a golden clear product.

EXAMPLE 2

The general procedure of Example 1 was followed except that 150.17 grams (1 mole) of triethylene glycol was used instead of the glycerol. The heptane was stripped off in a Rotovac apparatus to give a product having an acid number of 8.8 and an SH value of 12.8. The theoretical SH value is 14.7.

EXAMPLE 3

The general procedure of Example 2 was followed except that 106.12 grams (1 mole) of diethylene glycol was used instead of triethylene glycol and hexane was used as the azeotropic solvent. The azeotropic distillation of water was carried out at a pot temperature of 90° C. and a vapor temperature of 69° C. The SH value of the clear product was 16.2; theory is 18.3.

EXAMPLE 4

Caprylic acid (acid no. 373.6; 75.08 grams, 0.5 equivalent), thioglycolic acid (46.06 grams, 0.5 equivalent), glycerol (46.05 grams, 1.5 equivalents), and 0.13 gram of methanesulfonic acid were charged to a 500 ml round bottom flask equipped with a stirrer and attached to a vacuum pump. The reaction mixture was held at 100° C. under reduced pressure for 10 hours. The residue plus filter aid was filtered at 40° C. to give a product having an acid number of 8.3 and an SH value of 9.7. The theoretical SH value of the mixed caprylate/thioglycolate ester is 10.4.

EXAMPLE 5

Thioglycolic acid (46.06 grams, 0.5 mole), tetraethylene glycol (97.12 grams, 0.5 mole), 100 mls of heptane, 0.4 gram of p-toluene sulfonic acid, and 0.1 gram of butyl hydroxy toluene were heated in a round bottom flask equipped with a stirrer and a Dean-Stark trap to 100° C. and about 9.2 mls of water was removed. Continued heating and removal of the solvent under reduced pressure drove the acid value down to 17.3. The SH content was 11.35% whereas the theoretical value is 12.30.

EXAMPLE 6

Caprylic acid (78.72 grams, 0.5 equivalent), glycerol (46.05 grams, 1.5 equivalents), 50 mls of toluene, and 1.2 grams of p-TSA were heated in a round bottom flask equipped with a stirrer, condenser, and Dean-Stark trap (additional toluene added to the trap.). At 125° C., 9 mls of water were collected from the esterification reaction. Then, 46.06 grams thioglycolic acid (0.5 equivalent) were added and the mixture was heated to 110° C. to drive off another 9 mls of water. The reaction mixture was stripped under reduced pressure and filtered. The SH content was 9.78% whereas the theoretical value is 10.8%.

EXAMPLE 7

One mole (92.12 grams) of thioglycolic acid, one mole (90.12 grams) of ethylene glycol monoethyl ether, 100 mls of heptane, 0.4 gram of p-TSA, and 0.1 gram of butylhydroxy toluene were heated in a 500 ml round bottom flask equipped with stirrer, condenser and Dean-Stark trap to 100° C. until the acid value was reduced to about 10. After stripping off solvent, the acid value was 16. Additional ethylene glycol monoethyl ether was added and the mixture was heated to 100° C. under vacuum to reduce the acid value to 13.2. The SH content was 16.8/20.1.

EXAMPLE 8

One half mole (78.72 grams) of caprylic acid, one half mole (31.04 grams) of ethylene glycol, 100 mls of toluene, and 0.2 gram of p-TSA were heated in a flask equipped with stirrer, condenser, and Dean-Stark trap (filled with toluene) to 110° C. to remove 9 mls of water. One half mole (46.06 grams) of thioglycolic acid was added to the cooled mixture and the temperature was raised to 125° C. to remove more water. After stripping and filtering the reaction mixture, the SH content was 11.99/11.97%.

EXAMPLE 9

One mole (92.12 grams) of thioglycolic acid, one mole (118.12 grams) of ethylene glycol monobutyl ether, 100 mls of toluene, and 0.4 gram of p-TSA were heated in a flask equipped with a stirrer, condenser, Dean-Stark trap to 110° C. to drive off about one mole of water. The reaction mixture was stripped under vacuum. The SH content was 15.83/17.17%.

EXAMPLE 10

One-half equivalent (46.06 grams) of thioglycolic acid, 0.5 equivalent (75.06 grams) of caprylic acid, 1.5 equivalents (60.08 grams) of trimethylolethane, and 0.13 gram of p-TSA were heated in a flask under reduced pressure to 90° C. until the acid value was 9.8. The reaction mixture was filtered to give a clear liquid having an acid value of 8.25 and a SH content of 8.64/10.13%.

EXAMPLES 11 and 13

The zinc salts of the esters prepared in Examples 5 and 7 were prepared by adding 0.1 gram of acetic acid to the liquid ester and then gradually adding the stoichiometric amount of zinc oxide to the mixture and heating it to 100°–110° C. under vacuum for 2 hours. The zinc salt of the tetraethleneglycol thioglycolate (the product of Example 11) is a clear yellowish solid. The product of Example 13 was a white liquid that poured like water while still warm.

EXAMPLES 12 and 14–16

The zinc salts of the esters of Examples 6, 8, 9, and 10 were prepared by adding an aqueous solution of zinc chloride to an equivalent amount of the ester dispersed in an aqueous solution of an equivalent amount of sodium hydroxide at a temperature of 25°–30° C. while the stirred mixture was being cooled by an ice bath. The temperature was maintained for one hour. The aqueous reaction mixtures of Examples 12 and 14 were stripped under vacuum. The product of Example 12 (from ester of Ex. 6) was a viscous white liquid. The product of Example 14 (from the ester of Ex. 8) was a creamy white liquid. The reaction mixture in Example 15 (from ester of Ex. 9) separated into two phases and the organic phase was stripped under vacuum to yield a vascous, white liquid. The reaction mixture of Example 16 (from ester of Ex. 10) separated into two phases and the organic phase was stripped at 70° C. for one-half hour to yield a vascous, white liquid.

EXAMPLES 17–22

To a polymer composition having the following typical PVC pipe formulation:

| INGREDIENT | phr |
| --- | --- |
| Polyvinylchloride (K-67) | 100.0 |
| Calcium carbonate | 5.0 |
| Titanium dioxide | 1.0 |
| Calcium stearate | 0.45 |
| Paraffin wax | 1.3 |
| Oxidized polyethylene (Allied AC-629A) | 0.15 |
| Calcium hydroxide | 0.3 |
| Dihydropyridine | 0.3 | there was added 0.4 phr of a heat stabilizer, as follows:

Control: zinc bis(2-ethylhexylthioglycolate)
Example 17: zinc bis(tetraethylene glycol thioglycolate)
Example 18: zinc bis(glycerol caprate thioglycolate)
Example 19: zinc bis (ethylene glycol monoethyl ether thioglycolate)
Example 20: zinc bis(ethylene glycol caprate thioglycolate)
Example 21: zinc bis(ethylene glycol monobutyl ether thioglycolate)
Example 22: zinc bis(trimethylolethane caprylate thioglycolate)

Dynamic mill performance testing of the control and polymer compositions of this invention demonstrates the efficacy of this invention in the control of "zinc burn" during the fabrication of the pipe. In this testing procedure the Control and Examples were separately placed on a mill having a front roll operating at 30 rpm and a rear roll operating at 40 rpm, heated to 390° F. (199° C.) and were milled with sampling at two minute intervals. Colorimetry tests of the sampling gave the results shown in the following table, wherein the units of total color change ($\Delta E$) are given minute by minute. A $\Delta E$ of about one unit is noticeable to the eye.

| | COLOR CHANGE ($\Delta E$) | | | | | | |
|---|---|---|---|---|---|---|---|
| | EXAMPLE NO. | | | | | | |
| Min. | Cont. | 17 | 18 | 19 | 20 | 21 | 22 |
| 1 | 3.7 | 3.5 | 4.2 | 4.0 | 3.3 | 3.5 | 2.3 |
| 2 | 3.7 | 3.9 | 6.0 | 4.0 | 3.2 | 3.4 | 4.3 |
| 3 | 3.8 | 5.4 | 10.3 | 5.7 | 4.3 | 4.0 | 8.3 |
| 4 | 4.6 | 9.7 | 14.4 | 9.1 | 8.0 | 5.8 | 12.7 |
| 5 | 5.3 | 12.7 | 18.5 | 14.4 | 12.5 | 7.3 | 16.8 |
| 6 | 5.9 | 15.1 | 21.7 | 18.8 | 16.0 | 7.9 | 20.0 |
| 7 | 8.1 | 15.9 | 24.2 | 22.1 | 17.2 | 8.4 | 21.9 |
| 8 | 19.2 | 17.4 | 25.3 | 24.6 | 17.4 | 10.8 | 23.7 |
| 9 | 29.3 | 19.2 | 26.2 | 26.5 | 18.3 | 21.3 | 23.9 |
| 10 | 58.3 | 21.4 | 25.7 | 27.1 | 26.3 | 26.1 | 24.6 |
| 11 | — | 29.0 | 27.1 | 28.0 | 29.6 | 35.7 | 23.6 |
| 12 | — | 38.3 | 30.1 | 31.7 | 32.1 | — | 25.6 |

The data in the Table show that the total color change of the Control, a stabilizer of the prior art, doubled during the tenth minute to a value of about 58, whereas those of the present invention had a maximum color change of about 38 even after twelve minutes of milling.

The subject matter claimed is:

1. A heat stabilizer composition comprising a zinc mercaptoester having the formula:

wherein:

R is methyl or C—(O)OR';

R' is $[(CH_2-[C-(R^1)(R^2)]_yCH_2O)_zR^3]$;

$R^1$ is H, alkyl, or hydroxy alkyl;

$R^2$ is OH, hydroxy-substituted alkyl, or O(O=)C—$R^4$;

$R^3$ is H, (O=)C—$R^4$, or alkyl, $R^4$ is alkyl, or alkenyl, a=0 or 1; x=1 or 2; y=0 or 1; and z=1 to 4;

with the proviso that when z is greater than 1, y=0.

2. The composition of claim 1 wherein z=4.
3. The composition of claim 1 wherein z=2 and $R^3$ is alkyl.
4. The composition of claim 1 wherein z=1 and $R^3$ is (O=)C—$R^4$ and $R^4$ is alkyl.
5. The composition of claim 1 wherein z=1, y=1, $R^1$ is alkyl, and $R^2$ is hydroxyalkyl.
6. The composition of claim 1 wherein z=1, y=1, and $R^2$ is OH.
7. A polymer composition stabilized against the deteriorative effects of heat comprising a halogen-containing polymer and a stabilizer having the formula:

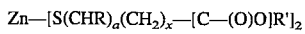

wherein:

R is methyl or C—(O)OR';

R' is $[(CH_2-[C-(R^1)(R^2)]_yCH_2O)_zR^3]$;

$R^1$ is H, alkyl, or hydroxy alkyl;

$R^2$ is OH, hydroxy-substituted alkyl, or O(O=)C—$R^4$;

$R^3$ is H, (O=)C—$R^4$, or alkyl, $R^4$ is alkyl, or alkenyl, a=0 or 1; x=1 or 2; y=0 or 1; and z=1 to 4;

with the proviso that when z is greater than 1, y=0.

8. The composition of claim 7 where z=4.
9. The composition of claim 7 where z=2 and $R^3$ is alkyl.
10. The composition of claim 7 where z=1 and $R^3$ is (O=)C—$R^4$ and $R^4$ is alkyl.
11. The composition of claim 7 where z=1, y=1, $R^1$ is alkyl, and $R^2$ is hydroxyalkyl.
12. The composition of claim 7 where z=2, y=1, and $R^2$ is OH.
13. An article fabricated from a polymer composition stabilized against the deteriorative effects of heat comprising a halogen-containing polymer and a stabilizer having the formula:

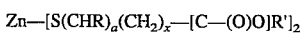

wherein:

R is methyl or C—(O)OR';

R' is $[(CH_2-[C-(R^1)(R^2)]_yCH_2O)_zR^3]$;

$R^1$ is H, alkyl, or hydroxy alkyl;

$R^2$ is OH, hydroxy-substituted alkyl, or O(O=)C—$R^4$;

$R^3$ is H, (O=)C—$R^4$, or alkyl, $R^4$ is alkyl, or alkenyl, a=0 or 1; x=1 or 2; y=0 or 1; and z=1 to 4;

with the proviso that when z is greater than 1, y=0.

14. The article of claim 13 wherein z=4.
15. The article of claim 13 wherein z=2 and $R^3$ is alkyl.
16. The article of claim 13 wherein z=1 and $R^3$ is (O=)C—$R^4$ and $R^4$ is alkyl.
17. The article of claim 13 wherein z=1, y=1, $R^1$ is alkyl, and $R^2$ is hydroxyalkyl.
18. The article of claim 13 wherein z=1, y=1, and $R^2$ is OH.

* * * * *

UNITED STATES PATENT AND TRADEMARK OFFICE
CERTIFICATE OF CORRECTION

PATENT NO. : 5,536,767
DATED : July 16, 1996
INVENTOR(S) : Beckman et al.

It is certified that error appears in the above-indentified patent and that said Letters Patent is hereby corrected as shown below:

*At column 2, Line 7, after "$R^3$ is", delete alkyl or aryl; and insert*
*-- H, (O=)C-$R^2$, alkyl, or aryl; --*

*At column 2, Line 8, after "$R^4$ is" delete "H, (O=C)R-$R^3$, alkyl, or aryl, and;" and insert*
*-- alkyl, or alkenyl, --*

Signed and Sealed this

Fourth Day of April, 2000

Attest:

Q. TODD DICKINSON

Attesting Officer

Director of Patents and Trademarks